(12) United States Patent
Spangler

(10) Patent No.: US 9,138,804 B2
(45) Date of Patent: Sep. 22, 2015

(54) CORE FOR A CASTING PROCESS

(75) Inventor: Brandon W. Spangler, Vernon, CT (US)

(73) Assignee: United Technologies Corporation, Hartford, CT (US)

( * ) Notice: Subject to any disclaimer, the term of this patent is extended or adjusted under 35 U.S.C. 154(b) by 764 days.

(21) Appl. No.: 13/347,944

(22) Filed: Jan. 11, 2012

(65) Prior Publication Data

US 2013/0177448 A1 Jul. 11, 2013

(51) Int. Cl.
- *F01D 5/18* (2006.01)
- *B22C 9/10* (2006.01)
- *B22C 7/02* (2006.01)
- *B22C 9/04* (2006.01)

(52) U.S. Cl.
CPC ... *B22C 9/10* (2013.01); *B22C 7/02* (2013.01); *B22C 9/04* (2013.01); *F01D 5/186* (2013.01); *F05D 2230/211* (2013.01); *Y02T 50/676* (2013.01)

(58) Field of Classification Search
CPC .......... F01D 5/186; F01D 5/18; F01D 5/187; F01D 5/14; F01D 5/147; B22C 7/02; B22C 7/06; B22C 9/04; B22C 9/10; F05F 2230/21

USPC ...................... 415/115; 416/97 R, 96 R, 96 A
See application file for complete search history.

(56) References Cited

U.S. PATENT DOCUMENTS

| | | | | |
|---|---|---|---|---|
| 5,599,166 A | * | 2/1997 | Deptowicz et al. | 416/97 R |
| 6,062,817 A | * | 5/2000 | Danowski et al. | 416/97 R |
| RE39,398 E | * | 11/2006 | Danowski et al. | 416/97 R |
| 7,144,220 B2 | | 12/2006 | Marcin, Jr. | |
| 7,186,085 B2 | * | 3/2007 | Lee | 416/97 R |
| 7,278,826 B2 | | 10/2007 | Blaskovich et al. | |
| 7,438,118 B2 | | 10/2008 | Santeler | |
| 7,841,083 B2 | | 11/2010 | Alaux et al. | |
| 7,866,370 B2 | | 1/2011 | Cunha | |
| 7,980,819 B2 | | 7/2011 | Albert et al. | |
| 8,096,771 B2 | * | 1/2012 | Liang | 416/97 R |
| 2009/0317234 A1 | | 12/2009 | Zausner et al. | |
| 2010/0074763 A1 | * | 3/2010 | Liang | 416/97 R |
| 2011/0094698 A1 | * | 4/2011 | Grunstra | 164/33 |

* cited by examiner

*Primary Examiner* — Dwayne J White
*Assistant Examiner* — William Grigos
(74) *Attorney, Agent, or Firm* — Carlson, Gaskey & Olds

(57) ABSTRACT

A core for a casting process includes a core body and a first cooling hole forming portion that extends from the core body. The core body includes a varying thickness along a length of the core body. The core body can include an undulating shaped section and can be a ceramic core body.

17 Claims, 3 Drawing Sheets

CORE FOR A CASTING PROCESS

BACKGROUND

This disclosure relates to a core employable in a casting process to manufacture a part.

Gas turbine engines are widely used in aircraft propulsion, electric power generation, ship propulsion and pumps. Many gas turbine engine parts are manufactured in a casting process. One example casting process is known as investment casting. Investment casting can be used to manufacture metallic parts having relatively complex geometries, such as gas turbine engine parts requiring internal cooling circuits. Blades and vanes are examples of such parts.

The investment casting process utilizes a mold having one or more mold cavities that include a shape generally corresponding to a part to be cast. A wax pattern of the part can be formed by injecting wax material around a ceramic core. A shell is formed around the core in a shelling process. The shell is fired to harden the shell and form the mold, which includes the shell having one or more part defining compartments that include the core. Molten material is communicated into the mold to cast the part. The shell and core are removed once the molten material cools and solidifies, thereby providing a cast part having an internal cooling circuitry.

The cast part may require cooling holes that are drilled into the body of the part. Such cooling holes may be desired to extend part life because of the relatively extreme operating conditions the part can be subjected to during engine operation.

SUMMARY

A core for a casting process includes a core body and a first cooling hole forming portion that extends from the core body. The core body includes a varying thickness across a length of the core body.

In a further embodiment of the foregoing core for a casting process embodiment, the core body can include a ceramic core body.

In a further embodiment of either of the foregoing embodiments, the first cooling hole forming portion can include at least a metering section and a diffusing section, and the metering section can be disposed between the core body and the metering section.

In a further embodiment of any of the foregoing embodiments, a second cooling hole forming portion can extend from the core body. The first cooling hole forming portion can include a first cross-sectional area and the second cooling hole forming portion can include a second cross sectional area that is different from the first cross-sectional area.

In a further embodiment of any of the foregoing embodiments, a second cooling hole forming portion can extend from the core body. The first cooling hole forming portion can extend a first distance from the core body and the second cooling hole forming portion can extend a second distance from the core body. The first distance can be different from the second distance.

In a further embodiment of any of the foregoing embodiments, the core body can include an undulating shaped section.

In a further embodiment of any of the foregoing embodiments, the undulating shaped section can include a plurality of peak portions and a plurality of trough portions.

In another exemplary embodiment, a casting process includes casting cooling holes into a gas turbine engine part using a core having a core body and a plurality of cooling hole forming portions that extend from the core body. At least a portion of the plurality of cooling hole forming portions can include different cross-sectional areas.

In a further embodiment of the foregoing casting process embodiment, the core can be cast in a fugitive casting process.

In a further embodiment of either of the foregoing embodiments, the core body can be provided with an undulating shaped section.

In a further embodiment of any of the foregoing embodiments, a distance that at least a portion of the plurality of cooling hole forming portions extend from the core body can be varied.

In a further embodiment of any of the foregoing embodiments, a thickness of the core body along a length of the core body can be varied.

In yet another exemplary embodiment, a part for a gas turbine engine includes an internal cooling circuit having a cavity, a first cooling opening, and a second cooling opening spaced from the first cooling opening along a length of the cavity. The first cooling opening extends a first distance from the cavity and the second cooling opening extends a second distance from the cavity that is different from the first distance.

In a further embodiment of the foregoing part for a gas turbine engine embodiment, the part can be an airfoil.

In a further embodiment of either of the foregoing embodiments, the cavity can include an undulating shape that extends along the length.

In a further embodiment of any of the foregoing embodiments, the first cooling opening can include a first cross-sectional area and the second cooling opening can include a second cross-sectional area that can be different from the first cross-sectional area.

In a further embodiment of any of the foregoing embodiments, each of the first cooling openings and the second cooling opening can extend through an exterior surface of the part.

The various features and advantages of this disclosure will become apparent to those skilled in the art from the following detailed description. The drawings that accompany the detailed description can be briefly described as follows.

DETAILED DESCRIPTION

Figure 1:
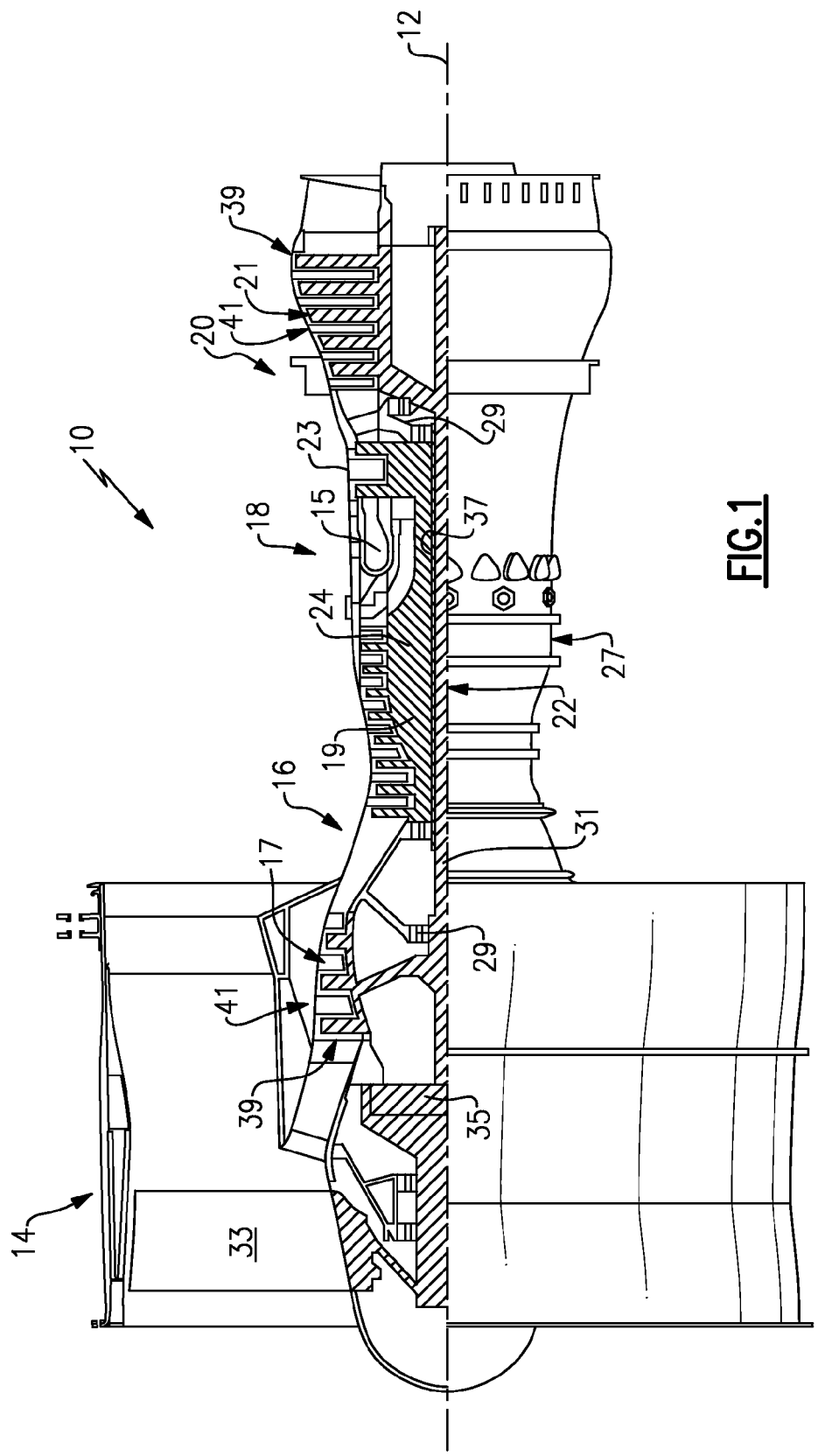
FIG. 1 schematically illustrates a gas turbine engine.

FIG. 1 schematically illustrates a gas turbine engine 10. The example gas turbine engine 10 is a two spool turbofan engine that generally incorporates a fan section 14, a compressor section 16, a combustor section 18 and a turbine section 20. Alternative engines might include fewer or additional sections such as an augmenter section (not shown), among other systems or features. Generally, the fan section 14 drives air along a bypass flow path, while the compressor section 16 drives air along a core flow path for compression and communication into the combustor section 18. The hot combustion gases generated in the combustor section 18 are expanded through the turbine section 20.

This view is highly schematic and is included to provide a basic understanding of the gas turbine engine 10 and not to limit the disclosure. This disclosure extends to all types of gas turbine engines and to all types of applications, including but not limited to, three spool turbofan configurations.

The example gas turbine engine 10 of FIG. 1 generally includes at least a low speed spool 22 and a high speed spool 24 mounted for rotation about an engine centerline axis 12 relative to an engine static structure 27 via several bearing systems 29. The low speed spool 22 generally includes an inner shaft 31 that interconnects a fan 33, a low pressure compressor 17, and a low pressure turbine 21. The inner shaft 31 can connect to the fan 33 through a geared architecture 35 to drive the fan 33 at a lower speed than the low speed spool 22. Although the geared architecture 35 is schematically depicted between the fan 33 and the low pressure compressor 17, the geared architecture 35 could be disposed at other locations of the gas turbine engine 10. The high speed spool 24 includes an outer shaft 37 that interconnects a high pressure compressor 19 and a high pressure turbine 23.

A combustor 15 is arranged between the high pressure compressor 19 and the high pressure turbine 23. The inner shaft 31 and the outer shaft 37 are concentric and rotate about the engine centerline axis 12. A core airflow is compressed by the low pressure compressor 17 and the high pressure compressor 19, is mixed with fuel and burned within the combustor 15, and is then expanded over the high pressure turbine 23 and the low pressure turbine 21. The turbines 21, 23 rotationally drive the low speed spool 22 and the high speed spool 24 in response to the expansion.

The compressor section 16 and the turbine section 20 can each include alternating rows of rotor assemblies 39 and vane assemblies 41. The rotor assemblies 39 carry a plurality of rotating blades, while each vane assembly 41 includes a plurality of stator vanes. The blades of the rotor assemblies 39 create or extract energy (in the form of pressure) from core airflow that is communicated through the gas turbine engine 10. The vanes of the vane assemblies 41 direct airflow to the blades of the rotor assemblies 39 to either add or extract energy.

The gas turbine engine 10 includes a plurality of parts that can be manufactured in a casting process, such as an investment casting process or other suitable casting process. For example, the blades and vanes carried in the compressor section 16 and the turbine section 20 of the gas turbine engine 10 can be manufactured in a casting process. The blades and the vanes, especially those in the turbine section 20, may be subjected to repetitive thermal cycling under widely ranging temperatures and pressures. Therefore, these parts may require internal cooling passages for cooling the part during engine operation. An example core for casting internal cooling circuits into a part is discussed below.

Figure 2:
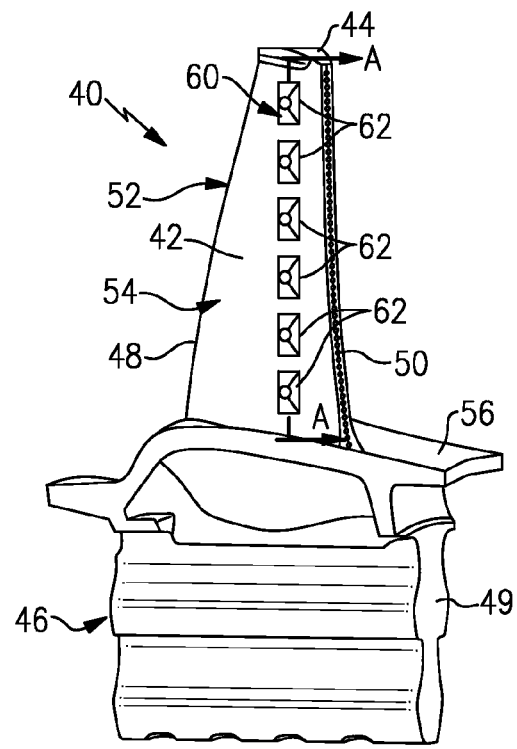
FIG. 2 illustrates a gas turbine engine part.

FIG. 2 illustrates a part 40 that can be cast in a casting process such as an investment casting process. In this example, the part 40 is an airfoil that can be incorporated into the compressor section 16 or the turbine section 20. However, the various features of this disclosure are applicable to any cast part of the gas turbine engine, or any other part, including but not limited to blade outer air seals (BOAS).

The exemplary part 40 includes an airfoil 42 that extends between a tip portion 44 and a root portion 46. The root portion 46 can include a fir-tree configuration 49 for attachment to a rotor assembly (not shown) for circumferential rotation about the engine centerline axis 12. Of course, other attachment configurations are also contemplated. The airfoil 42 extends between a leading edge 48 and a trailing edge 50, and includes a suction side 52 and a pressure side 54. The root portion 46 can also include a platform 56 that defines an inner gas path of the part 40.

The part 40 includes an internal cooling circuit 58 (See FIG. 3) that can be cast into the part 40 by employing a core 60 in a casting process. The part 40 is illustrated in FIG. 2 prior to removal of the core 60. The internal cooling circuit 58 includes a plurality of cooling openings 62 that extend through an exterior surface of the airfoil 42. In this example, the plurality of cooling openings 62 include filmhole cooling openings that communicate a cooling film onto an outer surface of the airfoil 42 to cool the part 40 during engine operation.

In the example embodiment, the core 60 is a ceramic core that is used during the casting process to define the internal cooling circuit 58, including the plurality of cooling openings 62. The core 60 can include any suitable ceramic material. The core 60 could exclude any refractory metal core (RMC) portions, although RMC portions could also be used. The core 60 forms the plurality of cooling openings 62 of the part 40 without the need for drilling such cooling openings 62. In other words, the core 60 is the inverse (i.e., the 3D "negative") of the internal structure of the part 40. After the part 40 is cast, the core 60 can be removed in a secondary operation such as a leaching operation.

Figure 3:
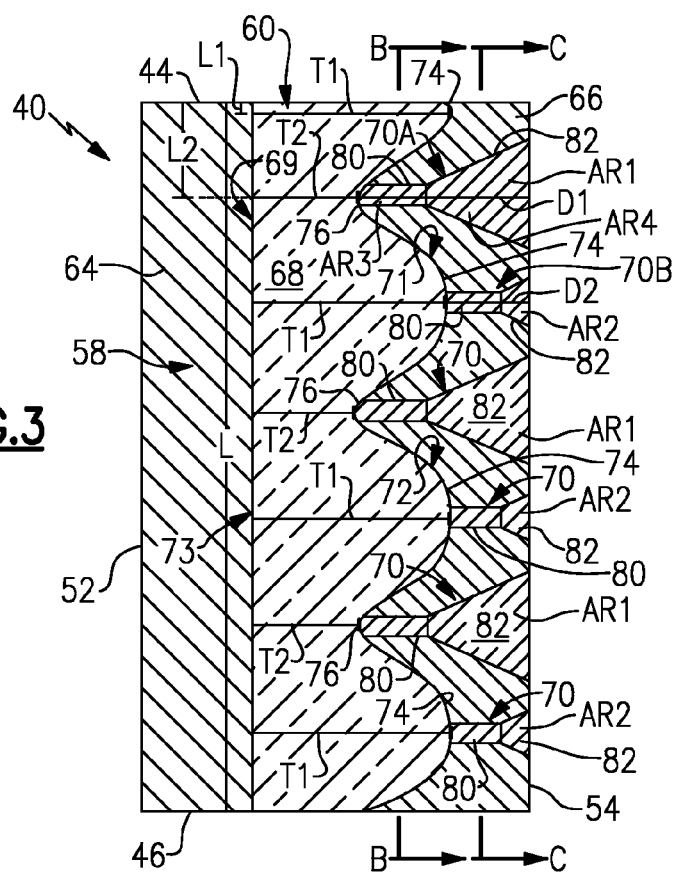
FIG. 3 illustrates a sectional view of the part of FIG. 2 including a core that can be used to cast the part.

FIG. 3 illustrates a sectional view of the part 40 through section A-A of FIG. 2. In FIG. 3, the part 40 is again illustrated prior to removal of the core 60 from the part 40. The core 60 extends between a first wall 64 and a second wall 66 of the part 40. The core 60 includes a core body 68 and a plurality of cooling hole forming portions 70 that extend from the core body 68 along a length L of the core body 68. The length L of the core body 68 can extend between the tip portion 44 and the root portion 46 of the part 40. A thickness T of the core body 68 extends between a first side 69 and a second side 71 of the core body 68.

The core body 68 includes a varying thickness across the length L of the core body 68. For example, the core body 68 defines a first thickness T1 at a first length L1 of the core body 68 and a second thickness T2 at a second length L2 of the core body 68. The remaining length of the core body 68 can similarly vary between thicknesses T1 and T2. Of course, other configurations are also contemplated as within the scope of this disclosure. The length L and thickness T of the core body 68 will vary depending on the type of part 40 being cast, and it should be understood that the illustrated lengths and thicknesses are shown for exemplary purposes only and in no way limit this disclosure.

The first side 69 of the core 60 can include a flat section 73. The second side 71 can include an undulating shaped section 72. The undulating shaped section 72 includes a plurality of peak portions 74 and a plurality of trough portions 76 that are interposed between adjacent peak portions 74. In this embodiment, one trough portion 76 extends between peak portions 74, and the undulating shaped section 72 faces the pressure side 54 of the part 40.

The core 60 can also include a plurality of cooling hole forming portions 70 that protrude from the undulating shaped section 72 of the core body 68. Each example cooling hole forming portion 70 includes a metering section 80 and a diffusing section 82, although each cooling hole forming portion 70 could include fewer or additional features. The metering sections 80 extend between the diffusing sections 82 and the core body 68. Once the core 60 is removed from the part 40, the voids left by removal of the cooling hole forming portions 70 within the internal portion of the part 40 establish the plurality of cooling openings 62 of the internal cooling circuit 58, while removal of the core body 68 leaves a void that corresponds to a cavity of the internal cooling circuit 58.

In the illustrated embodiment, each metering section 80 is generally rectangular shaped (in cross-section) and each diffusing section 82 is generally triangular shaped (in cross-section), although other cross-sectional shapes are also contemplated, including but not limited to circular, oblong, square, rectangular, conical, pyramidal triangular, etc. The metering sections 80 of the cooling hole forming portions 70 can have equivalent diameters. However, the diffusing sections 82 include varying diameters and are of varying sizes.

The metering sections 80 of the cooling hole forming portions 70 establish the flow rate of cooling airflow through the part 40. The diffusing sections 82 slow the cooling airflow down, allowing the cooling airflow to stay attached to the external surface of the part 40 and provide a thin layer of cooling film through the cooling opening 62.

A first cooling hole forming portion 70A extends a first distance D1 from an external surface of the core body 68, while a second cooling hole forming portion 70B that is spaced from the first cooling hole forming portion 70A extends a second distance D2 from the external surface of the core body 68. The first distance D1 and the second distance D2 are different distances. In this example, the second distance D2 is smaller than the first distance D1. This pattern can be repeated along the length L of the core body 68, such as in a staggered arrangement. Other configurations are also contemplated.

The metering sections 80 and diffusing sections 82 combine to define a cross-sectional area AR of each cooling hole forming portion 70. In this embodiment, adjacent cooling hole forming portions 70 include varying cross-sectional areas AR1 and AR2. For example, the cross-sectional area AR1 of a first cooling hole forming portion 70A is a greater cross-sectional area than a cross-sectional area AR2 of the second cooling hole forming portion 70B. This pattern can be repeated along the length L of the core 60. In one example, a cross-sectional area AR3 of each metering section 80 is the same for each cooling hole forming portion 70, while a cross-sectional area AR4 of each diffusing section 82 varies for each cooling hole forming portion 70. However, the cross-sectional areas established by the metering sections 80 and the diffusing sections 82 can vary.

Figure 4:
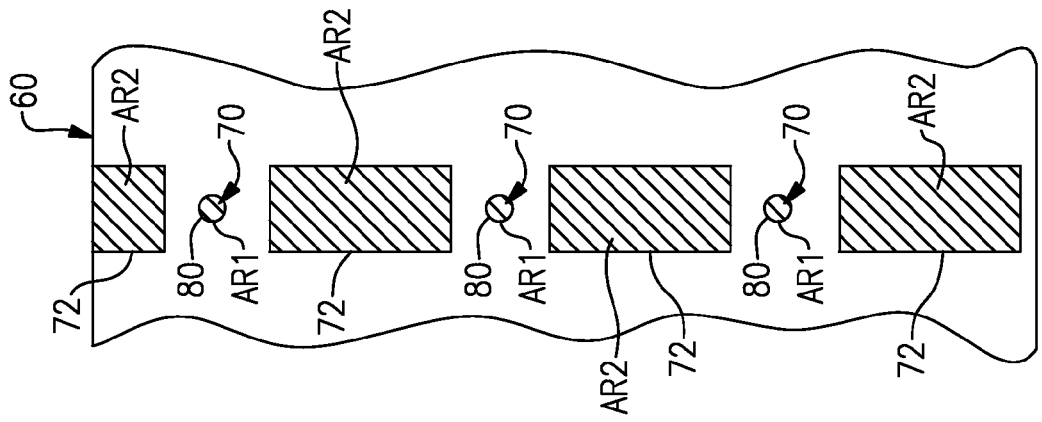
FIG. 4 illustrates a first view of the core of FIG. 3.

FIG. 4 illustrates a first cross-sectional slice through section B-B of FIG. 3. As can be appreciated, a cross-sectional area AR1 of each of the cooling hole forming portions 70 is the same through section B-B because this section extends through the metering sections 80 which have equivalent cross-sectional areas (i.e., the cross-sectional area of each metering section 80 is the same cross-sectional area AR1). However, portions of section B-B also extend through the core body 68. The stiffness of the core 60 is increased through section B-B by incorporating the undulating shaped section 72, which includes a cross-sectional area AR2 at each peak portion 74. In other words, the total cross sectional area (i.e., the sum of all cross-sectional areas A1, A2) of the core body 68 and the cooling hole forming portions 70 through section B-B is sufficient to meet the stiffness requirements of the core 60. The core stiffness must be great enough to withstand the forces that may occur during a casting process, such as shear stress and bending moments that can occur during wax, ceramic or metallic injection.

Figure 5:
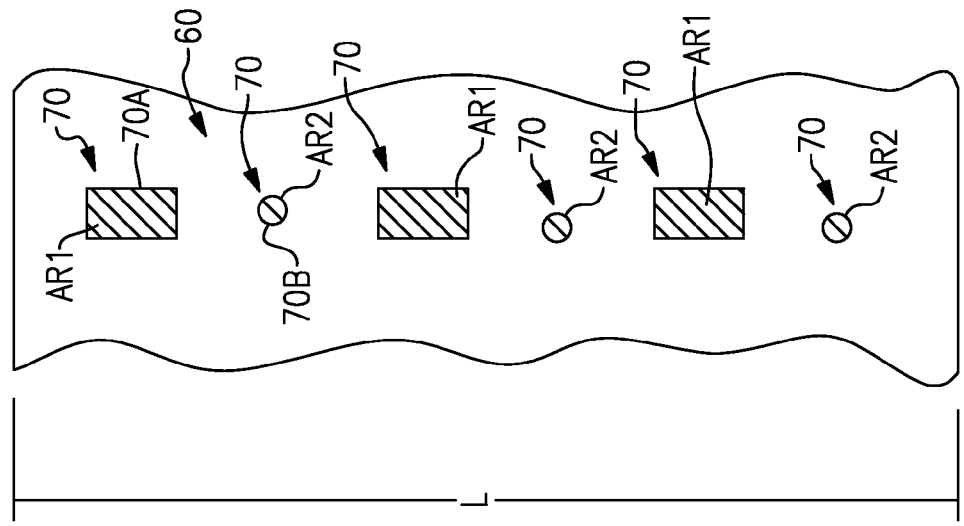
FIG. 5 illustrates a second view of the core of FIG. 3.

FIG. 5 illustrates yet another cross-sectional slice through section C-C of FIG. 3. A cross-sectional area AR of each cooling hole forming portion 70 varies through the section C-C. In other words, for any longitudinal slice that extends through only the cooling hole forming portions 70 (and not through any portion of the core body 68), the cross-sectional area AR will vary along the length L.

A first cooling hole forming portion 70A includes a first cross sectional area AR1, while a second cooling hole forming portion 70B includes a second cross-sectional area AR2. The first cross sectional area AR1 is a different cross-sectional area than the second cross-sectional area AR2. In this example, the first cross-sectional area AR1 is greater than the second cross-sectional area AR2. This pattern can be repeated along the length L of the core body 68, such as in a staggered arrangement. Other configurations are also contemplated.

A total cross-sectional area of all of the plurality of cooling hole forming portions 70 (i.e., the sum of all cross-sectional areas AR1 and AR2) provides adequate core stiffness for withstanding forces that may occur during a casting process, such as shear stress and bending moments that can occur during wax, ceramic or metallic injection. Therefore, the cooling hole forming portions 70 (and relatedly the cooling openings 62 of the part 40) can be cast. Additional finishing operations, such as drilling the cooling openings, are not required. Also, in the illustrated embodiments, the core 60 excludes any refractory metal core (RMC) portions. That is, RMC portions are not necessary to provide the cooling openings 62, although it should be understood that RMC portions could be incorporated into the core 60.

The core 60 illustrated in FIGS. 2-5 can be cast in a casting process, such as a fugitive casting process. One example casting process is illustrated in U.S. Patent Publication 2011/0094698, which is incorporated herein by reference. However, this disclosure is not limited to such a casting process, and it should be understood that other casting operations could be used to cast the core 60.

After the core 60 is cast, the core 60 can be utilized within a known casting operation. For example, the core 60 can be employed in an investment casting operation to cast a part, such as the part 40 illustrated herein. By using a core 60 having the core body 68 (with a varying thickness across its length) and the cooling hole forming portions 70 (that extend at varying distances from the core body 68), a part 40 can be formed having an internal cooling circuit 58 that includes a cavity having an undulating shape and a plurality of cooling openings 62 that can extend various distances from the cavity (See FIG. 3, core 60 would be removed leaving voids that represent the cavity and the cooling openings 62). The cooling openings 62 could be formed having different cross-sectional areas.

Although the different examples have the specific examples shown in the illustrations, embodiments of this disclosure are not limited to those particular combinations. It is possible to use some of the components or features from one of the examples or features in combination with features or components from another one of the examples.

Furthermore, the forgoing description shall be interpreted as illustrative and not in any limiting in sense. A worker of ordinary skill in the art would understand that certain modifications could come within the scope of this disclosure. For these reasons, the following claims should be studied to determine the true scope and content of this disclosure.

What is claimed is:
1. A core for a casting process, comprising:
   a core body; and
   a first cooling hole forming portion and a second cooling hole forming portion that extend from said core body, wherein said core body includes an undulating shaped section that alternates between a first thickness and a second thickness along a length of said core body, and said first cooling hole forming portion extends from a peak portion of said undulating shaped section and said second cooling hole forming portion extends from a trough portion of said undulating shaped section.

2. The core as recited in claim 1, wherein said core body includes a ceramic core body.

3. The core as recited in claim 1, wherein said first cooling hole forming portion includes at least a metering section and a diffusing section, and said metering section is disposed between said core body and said diffusing section.

4. The core as recited in claim 1, wherein said first cooling hole forming portion includes a first cross-sectional area and said second cooling hole forming portion includes a second cross sectional area that is different from said first cross-sectional area.

5. The core as recited in claim 1, wherein said first cooling hole forming portion extends a first distance from said core body and said second cooling hole forming portion extends a second distance from said core body, wherein said first distance is different from said second distance.

6. The core as recited in claim 1, wherein said undulating shaped section includes a plurality of peak portions and a plurality of trough portions.

7. A casting process, comprising the steps of:
casting cooling holes into a gas turbine engine part using a core having a core body that includes an undulating shaped section and a plurality of cooling hole forming portions that extend from the undulating shaped section of the core body, wherein at least a portion of the plurality of cooling hole forming portions have different cross-sectional areas; and
a first cooling hole forming portion of the plurality of cooling hole forming portions extending from a peak portion of the undulating shaped section and a second cooling hole forming portion of the plurality of cooling hole forming portions extending from a trough portion of the undulating shaped section.

8. The method as recited in claim 7, comprising the step of casting the core in a fugitive casting process.

9. The method as recited in claim 7, comprising the step of varying a distance that at least a portion of the plurality of cooling hole forming portions extend from the core body.

10. The method as recited in claim 7, comprising the step of varying a thickness of the core body along a length of the core body.

11. A part for a gas turbine engine, comprising:
an internal cooling circuit having a cavity, a first cooling opening, and a second cooling opening spaced from said first cooling opening along a length of said cavity;
said cavity including an undulating shape along said length to define a plurality of peak portions and a plurality of trough portions, said first cooling opening extending from one of said plurality of peak portions and said second cooling opening extending from one of said plurality of trough portions such that said first cooling opening extends a first distance from said cavity and said second cooling opening extends a second distance from said cavity that is different from said first distance.

12. The part as recited in claim 11, wherein said part is an airfoil.

13. The part as recited in claim 11, wherein said first cooling opening includes a first cross-sectional area and said second cooling opening includes a second cross-sectional area that is different from said first cross-sectional area.

14. The part as recited in claim 11, wherein each of said first cooling opening and said second cooling opening extend through an exterior surface of said part.

15. The core as recited in claim 6, wherein said plurality of peak portions are disposed at portions of said undulating shaped section that include said first thickness and said plurality of trough portions are disposed at portions of said undulating shaped section that include said second thickness.

16. The core as recited in claim 1, wherein said core body includes a first side and a second side, and said first side includes a flat section and said second side includes said undulating shaped section.

17. The part as recited in claim 11, wherein each of said first cooling opening and said second cooling opening include a metering section and a diffusing section that includes a greater diameter than said metering section.

* * * * *

UNITED STATES PATENT AND TRADEMARK OFFICE
CERTIFICATE OF CORRECTION

| | | |
|---|---|---|
| PATENT NO. | : 9,138,804 B2 | Page 1 of 1 |
| APPLICATION NO. | : 13/347944 | |
| DATED | : September 22, 2015 | |
| INVENTOR(S) | : Brandon W. Spangler | |

It is certified that error appears in the above-identified patent and that said Letters Patent is hereby corrected as shown below:

IN THE CLAIMS:

In claim 1, column 6, line 65; delete "alength" and replace with --a length--

Signed and Sealed this
Fifteenth Day of March, 2016

Michelle K. Lee
*Director of the United States Patent and Trademark Office*